(12) United States Patent
Hayashida

(10) Patent No.: US 6,396,299 B1
(45) Date of Patent: May 28, 2002

(54) METHOD AND APPARATUS FOR SUBSTRATE DEFECT TESTING BY SURFACE ILLUMINATION

(75) Inventor: Manabu Hayashida, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/272,050

(22) Filed: Mar. 19, 1999

(30) Foreign Application Priority Data

Mar. 20, 1998 (JP) .......................................... 10-092425

(51) Int. Cl.[7] .............................................. G01R 31/26
(52) U.S. Cl. ........................................................ 324/770
(58) Field of Search ................................ 324/765, 73.1, 324/770, 158.1, 71.3; 348/125; 356/345, 400

(56) References Cited

U.S. PATENT DOCUMENTS

| | | | | |
|---|---|---|---|---|
| 4,870,357 A | * | 9/1989 | Young et al. ................ | 324/770 |
| 4,899,105 A | * | 2/1990 | Akiyama ..................... | 324/770 |
| 5,113,134 A | * | 5/1992 | Plus et al. ................... | 324/765 |
| 5,285,150 A | * | 2/1994 | Henley et al. .............. | 324/73.1 |

FOREIGN PATENT DOCUMENTS

| | | |
|---|---|---|
| JP | 1-212328 | 8/1989 |
| JP | 1-292736 | 11/1989 |
| JP | 2-62254 | 3/1990 |
| JP | 2-136761 | 5/1990 |
| JP | 4-147128 | 5/1992 |
| JP | 5-107148 | 4/1993 |
| JP | 7-13598 | 2/1995 |
| JP | 9-196814 | 7/1997 |
| JP | 09-210855 | 8/1997 |

OTHER PUBLICATIONS

Patent Abstracts of Japan, vol. 014, No. 561 (P1142), Dec. 13, 1990.
Francois Henley et al., "A High Speed Flat Panel In–Process Test System for TFT Array Using Electro–Optic Effects", *IEICE Transactions on Electronics,* vol. E76–C, No. 1, Jan. 1, 1993, pp. 64–67.
Takashi Kido et al., "Optical Charge–Sensing Method for Testing and Characterizing Thin–Film Transistor Arrays", *IEEE Journal of Selected Topics In Quantum Electronics,* vol. 1, No. 1, Dec. 1, 1995, pp. 993–1000.

* cited by examiner

*Primary Examiner*—Vinh P. Nguyen
(74) *Attorney, Agent, or Firm*—Sughrue Mion, PLLC

(57) ABSTRACT

To provide a surface light source prober apparatus which is capable of detecting a point defect on a pixel which can not be detected by a prior art and enhancing the inspection precision and reducing the cost of inspection, a surface light source prober apparatus of the present invention uses a D.C. light source for irradiating the entire surface of an LCD substrate to be inspected which is placed on a stage with a D.C. light. A polarization shutter is switched for transmitting or intercepting the D.C. light from the D.C. light source, which is incident upon the LCD substrate; a probe is used for applying a voltage upon a terminal of the LCD substrate to accumulate electrostatic charge on an auxiliary capacitor of a pixel of the LCD substrate and for reading the accumulated charge. The shutter is controlled so that the entire surface of the LCD substrate to be inspected is irradiated with the D.C. light from the D.C. light source via the polarization shutter.

20 Claims, 7 Drawing Sheets

LONG SIDE OF SUBSTRATE

SHORT SIDE OF SUBSTRATE

| 67 | 68 | 69 | 70 | 70 | 68 | 68 | 68 | 67 |
|----|----|----|----|----|----|----|----|----|
| 67 | 69 | 70 | 71 | 70 | 69 | 69 | 68 | 67 |
| 67 | 70 | 70 | 71 | 70 | 71 | 70 | 68 | 67 |
| 67 | 70 | 70 | 71 | 71 | 71 | 70 | 68 | 67 |
| 67 | 70 | 71 | 71 | 71 | 71 | 70 | 69 | 67 |
| 67 | 70 | 71 | 72 | 71 | 71 | 70 | 69 | 67 |
| 68 | 70 | 71 | 72 | 72 | 72 | 70 | 69 | 67 |
| 68 | 70 | 71 | 72 | 71 | 71 | 69 | 68 | 67 |
| 68 | 69 | 70 | 71 | 70 | 70 | 69 | 68 | 67 |
| 68 | 69 | 70 | 70 | 70 | 70 | 68 | 68 | 67 |
| 68 | 69 | 69 | 69 | 69 | 69 | 67 | 67 | 67 |

MAX=72   MIN=67   Average=69.2
Uniformity (+/-) =3.0 %

| | 1 | 2 | 3 | 4 | 5 | 6 | 7 | 8 | 9 |
|---|---|---|---|---|---|---|---|---|---|
| PRESET ILLUMINATION VALUE | 70 | 70 | 70 | 70 | 70 | 70 | 70 | 70 | 70 |
| ILLUMINATION DISTRIBUTION (LONG SIDE) | 67 | 70 | 71 | 72 | 71 | 71 | 70 | 69 | 67 |

(b)

ILLUMINATION DISTRIBUTION (LONG SIDE DIRECTION)

| | 1 | 2 | 3 | 4 | 5 | 6 | 7 | 8 | 9 | 10 | 11 |
|---|---|---|---|---|---|---|---|---|---|----|----|
| PRESET ILLUMINATION VALUE | 70 | 70 | 70 | 70 | 70 | 70 | 70 | 70 | 70 | 70 | 70 |
| ILLUMINATION DISTRIBUTION (LONG SIDE) | 70 | 70 | 70 | 71 | 71 | 71 | 72 | 71 | 70 | 70 | 69 |

METHOD AND APPARATUS FOR SUBSTRATE DEFECT TESTING BY SURFACE ILLUMINATION

TECHNICAL FIELD

The present invention relates to an apparatus for inspecting a defect in a liquid crystal display and in particular to a surface light source prober apparatus and a inspecting method.

BACKGROUND OF THE INVENTION

A conventional method of inspecting a defect in a liquid crystal display will be explained.

Firstly, in order to inspect defects which occur in a thin film transistor (TFT) array on a substrate, such as break and short of patterns and defects of TFT characteristics, probes for applying voltages and probes for detecting currents are brought into contact with D1 to Dn drain lines and G1 to Gn gate lines, respectively and application of a voltage and detection of a current is conducted and the LCD substrate is exposed to a light from a light source which is provided in a defect inspecting apparatus and TFTs are brought into a conductive state. This enables the defects to be detected if any.

As one of conventional methods of inspecting a defect in the liquid crystal display, there has been known a method of inspecting a point defect on a matrix substrate to prevent an unqualified product from being passed to the subsequent step by exposure of an active type matrix panel to a light from the upper and/or lower side thereof in a defect inspecting apparatus having a feature of detecting the potential of electrodes of pixels by irradiating one of substrates having a switching element in each pixel with an electron beam in the active matrix panel (refer to, for example, Japanese Unexamined Pat. Kokai Publication 1-292736).

Some of means for irradiating light switching elements formed on signal lines of the liquid crystal panel with a light uses a laser light (refer to, for example, Japanese Unexamined Pat. Kokai Publication 2-136761). This method remarkably reduces means for connecting the probes in the prior art inspecting apparatus for conducting an inspection by probing all signal lines.

Further, there has been known an inspecting method of irradiating thin film transistors with a visible light in an inspecting apparatus for electrically measuring the characteristics between terminals of thin film transistors to be measured, which are incorporated in the liquid crystal display (refer to, for example, Japanese Patent Kokai Publication 1-212328). In accordance with this inspecting method, the influence of insulating resistance of the probes and relay scanner per se upon the insulating resistance between terminals to be measured of TFT can be reduced. Shortening of the period of settling time of a resistance meter and high speed and precision inspection can be achieved.

SUMMARY OF THE DISCLOSURE

However, the above-mentioned prior art methods of inspecting liquid crystal display have problems as follows:

In order to bring the amorphous silicon film (hereinafter referred to as "a-Si film") of each individual pixel of the entire LCD substrate into a conductive state, it is exposed to a light. The a-Si film may be brought into completely shortened state or inspection of line defect is possible due to differences in the intensity of light and illumination ununiformity, but more precise inspection than the line defect inspection is impossible.

Therefore, the present invention has been realized in order to overcome the above-mentioned problems. It is an object of the present invention to provide a surface light source or illuminant prober device and an method of inspecting a TFT array which is capable of detecting a point defect in an pixel area, which could not otherwise be detected, enhances the inspection precision and reduces the cost.

Further objects of the present invention will become apparent in the entire disclosure.

In order to achieve the above-mentioned object, according to an aspect of the present invention there is provided a surface prober apparatus, characterized in that said apparatus comprises means for controlling a light from a D.C. light source so that the entire surface of an LCD substrate to be inspected is irradiated with said light only at a predetermined inspection step in synchronization with an inspection process.

According to a second aspect, the apparatus comprises a shutter, opening and closing of which is controlled so that the entire surface of an LCD substrate is irradiated with a light from a D.C. light source only upon point defect inspection in an inspection process.

According to a third aspect, the apparatus comprises a D.C. light source for irradiating the entire surface of an LCD substrate to be inspected which is placed on a stage with a D.C. light; and a shutter between said D.C. light source and said LCD substrate, whereby said shutter is controlled so that the light from said D.C. light source is incident upon the entire surface of the LCD substrate to be inspected via said shutter only upon point defect inspection.

In a fourth aspect, the apparatus comprises; a D.C. light source for irradiating the entire surface of an LCD substrate to be inspected which is placed on a stage with a D.C. light; a polarization shutter which is switched for transmitting or intercepting a D.C. light from said D.C. light source, which is incident upon said LCD substrate; and probe means for applying a voltage upon a terminal of said LCD substrate to accumulate electrostatic charge on an auxiliary capacitor of a pixel of said LCD substrate and for reading the accumulated charge, wherein the shutter is controlled so that the entire surface of the LCD substrate to be inspected is uniformly irradiated with the D.C. light from said D.C. light source via said polarization filter only on point defect inspection.

According to a fifth aspect, there is provided a method of inspecting a liquid crystal display characterized in that on inspection of a TFT (thin film transistor) array by using a prober apparatus, a D.C. light having a uniform illumination which can be finely adjusted in a given range is controlled so that the TFT is irradiated with the D.C. light for point defect inspection in response to a control signal from a test device when a transistor circuit on the substrate to be inspected is turned on, and that a defect of said pixel is detected if any by detecting the amount of the leaked charge which has been accumulated in an auxiliary capacitor provided in the pixel, the leakage being caused by a short due to photoconductive effect of an amorphous silicon film residue which has not been etched in a TFT array manufacturing process.

The present invention makes it possible to detect a point defect in a display occurring due to an amorphous silicon residue and the like which has been left in a TFT array manufacturing process by irradiating a TFT array with a light from a D.C. lamp via a polarization shutter in a surface light source prober apparatus used at the final inspection step in a process for manufacturing a TFT array for liquid crystal display (LCD) using amorphous silicon (hereinafter referred to a "a-Si" film transistors.

DETAILED DESCRIPTION OF THE PRESENT INVENTION

The embodiments of the present invention will now be described.

The position of and the type of defect are identified based upon a result of measurement of the amount of the leaked accumulated charge which is obtained by bringing a thin film transistor provided each of pixels of the LCD substrate into a conductive state. The D.C. light source is configured in such a manner that the variation in the illumination over the LCD substrate is within a predetermined range, preferably within 3%. The point defect detection of a TFT is conducted by detecting a short of a pixel caused by the presence of an amorphous silicon film residue left in a TFT manufacturing process through measuring the amount of electrostatic charge leaked from an auxiliary capacitor provided in said pixel. The D.C. light source comprises a D.C. lamp. The polarization shutter has a TN type liquid crystal structure and is controlled for opening or closing depending upon the presence or absence of applied voltage.

Figure 1:
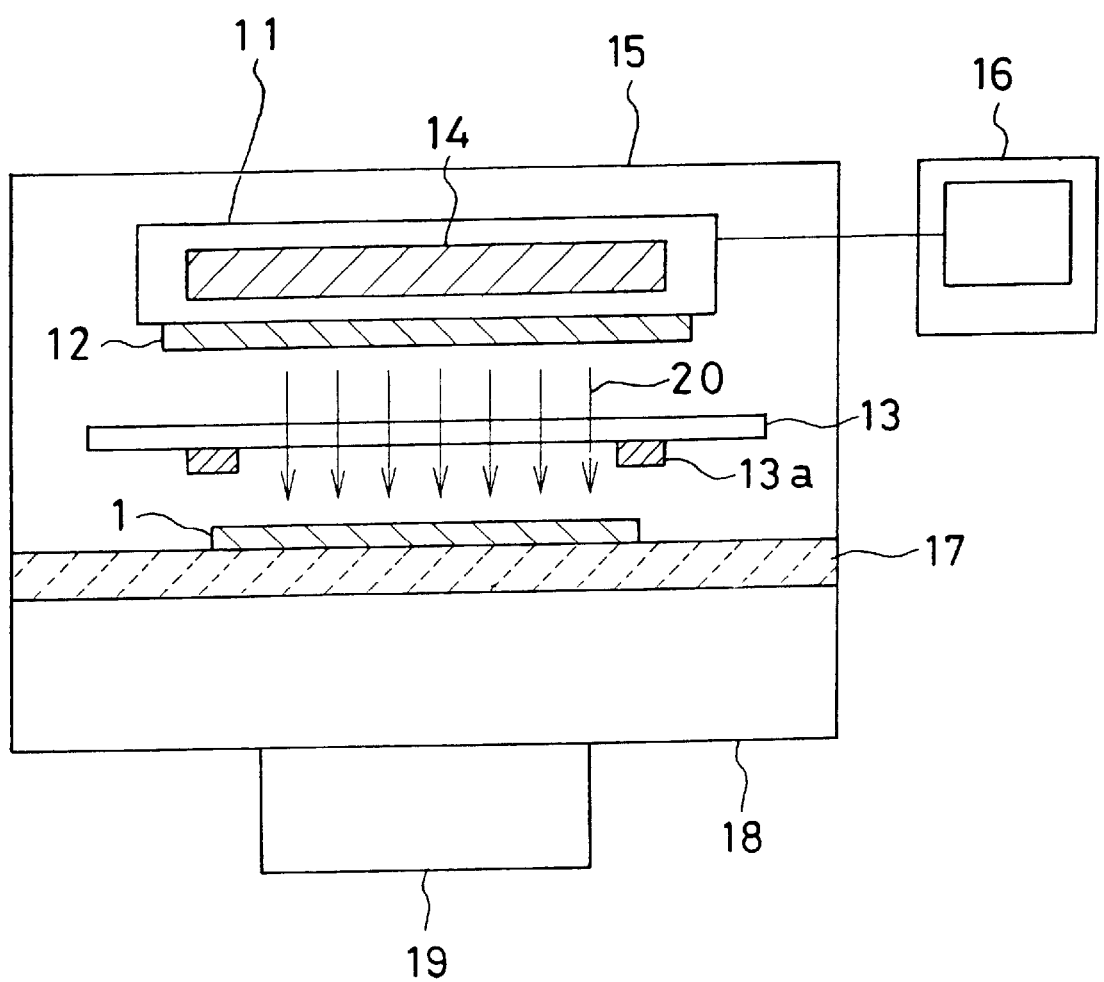
FIG. 1 is a diagram showing a structure of an embodiment of the present invention.

Referring now to FIG. 1, there is shown a preferred embodiment of the surface light source prober apparatus of the present invention. An LCD substrate 1 is placed on a suction table 17 on a stage 18 Specifically, the LCD substrate 1 is placed in a planar manner on the suction table 17 so that it is fixed at a high precision.

The prober unit 13 and a manipulator 13a are brought into direct contact with the gate terminals 2 and the drain terminals 3 of the LCD substrate 1 and a voltage is applied to the terminals from a tester device (not shown).

Thereafter, the test is commenced. The entire surface of the LCD substrate 1 irradiated with a D.C. light by opening a polarization filter 12 at an illuminance having a given range from a light source 12 powered by a DC component at a point defect detecting process in the inspection process. This enables a point defect due to residual a-Si film on a TFT array to be detected.

The period of time at which the polarizing shutter 12 is opened and the light having an illuminance with no irregularities due to D.C. component and which is finely variable in a given range is controlled so that the entire surface of the LCD substrate 12 is irradiated with a D.C. light 12 having a D.C. component when the transistor circuit is turned on in an embodiment of the present invention.

A small leakage of holding charge due to the photoconductive effect is detected so that it can be determined that its pixel is defective.

Figure 2:
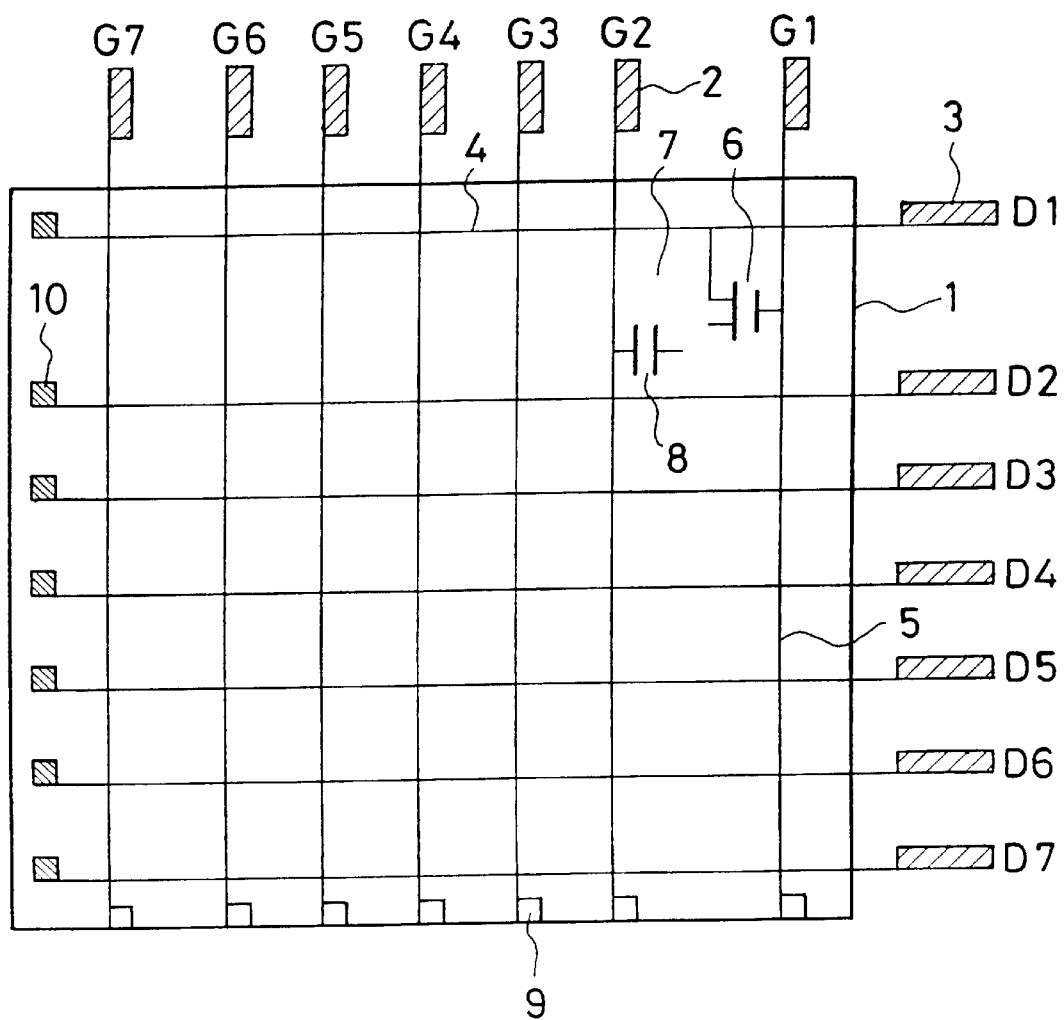
FIG. 2 is a plan view of an LCD substrate for explaining an embodiment of the present invention.

FIG. 1 is a schematic diagram showing the structure of an embodiment of the present invention. FIG. 2 is a plan view of an LCD substrate (TFT substrate) explaining the embodiment of the present invention.

Referring now to FIG. 1, when the surface light source prober apparatus inspects the circuit of the LCD substrate 1 in the embodiment, it firstly moves the LCD substrate 1 to an inspection position, that is a position which is defined by the stage 18 and the suction table 17 with the aid of a handling means such as robot arm and firmly secures the substrate by means such as vacuum suction means.

Referring now to FIGS. 1 and 2, the surface light source prober apparatus comprises the manipulator 13a which is brought into direct contact with gate and drain terminals 2 and 3 of the TFT (thin film transistor) 6 of the LCD substrate 1 and the prober unit 13 which serves as a platen on which the manipulator 13a is mounted. FIG. 2 also shows LCD substrate a having a data line 4, the gate scanning line 5, a gate pad 9, and a drain pad 10. Referring to FIG. 1 again, the embodiment of the present invention further includes an illumination jig 11, polarization shutter 12, light source 14, shield box 15 and a light control box 16.

The illumination jig 11 comprises a bracket for mounting the light source 14 and a platen and is disposed above the probe unit 13.

The light source 14 for actually emitting light is disposed within the illumination jig 11. The light control box 16 is adapted to control the illumination of the light from the light source 14.

The LCD substrate 1 is irradiated over its entire surface with a light from the light source 14 by opening the polarization shutter 12 under control of a tester device (not shown) on point defect inspection in the course of the inspection process.

In the inspection process excepting the point defect inspection step, the substrate is inspected in a dark environment within the shield box 15 when the polarization shutter 12 is closed.

The illumination jig 11, light source 14 and the light control box 16 are lit for constantly emitting D.C. light since the initial phase in which the inspection is commenced.

The polarization shutter 12 is opened or closed in response to a trigger signal from the measuring tester device to pass or intercept the D.C. light 20 emitted from the light source 14 for controlling irradiation of the LCD substrate 1 with the light.

Referring FIGS. 1 and 2 again, the probe unit 13 and manipulator 13a are brought into direct contact with the gate and drain terminals 2 and 3 to apply a voltage thereto for electrically inspecting the LCD substrate 1.

The stage 18 and stage shaft 19 are adapted to position the LCD substrate 1 in a planar manner to inspect the LCD substrate 1 and to elevate it up to the manipulator 13a and lower it therefrom.

After the suction table 17 has been placed on the stage 18 in a planar manner, the table 17 aligns the LCD substrate 1 with the manipulator 13a so that manipulator can precisely contact with the gate and drain terminals 2 and 3 and sucks the substrate 1 for securing thereof.

The illumination jig 11 and the light source 14 are illumination devices which are lit by a D.C. current for constantly emitting a D.C. light 20 under control of a lighting signal from the light control box 16.

The light control box 16 is a unit for controlling the lighting of the light source 14 and illumination jig 11 and outputs a lighting signal in response to an inspection initiating instruction from the tester device.

The polarization shutter 12 is opened for directly irradiating the LCD substrate 1 with the D.C. light 20 only at the point defect detecting step in the inspection process and is normally closed in the process other than the point defect detecting step.

The probe unit 13 and manipulator 13a constitute means which brings probes each having a pointed tip, such as pogo pins or needles into contact with the terminals of the LCD substrate 1, such as gate and drain terminals 2 and 3 to apply a voltage thereto for accumulating electrostatic charge on auxiliary capacitors 8 of pixels 7 and reads the accumulated charges.

The stage 18 and stage shaft 19 position the LCD substrate in such a manner that the inspection therefor is enabled, that is, in a planar manner and elevate the LCD substrate 1 up to a position in which the substrate can be in contact with the manipulator 13a since the latter is fixed. Alternatively, they move the LCD substrate 1 to next panel, or lower the LCD substrate 1 for releasing the contact between the manipulator 13a and the LCD substrate 1 after completion of inspection.

The suction table 17 achieves precise registration, or alignment between the manipulator 13a and the gate and drain terminals 2 and 3 of the LCD substrate 1 for contact therebetween and precise securing of the LCD substrate 1 on the suction table 17.

Figure 3:
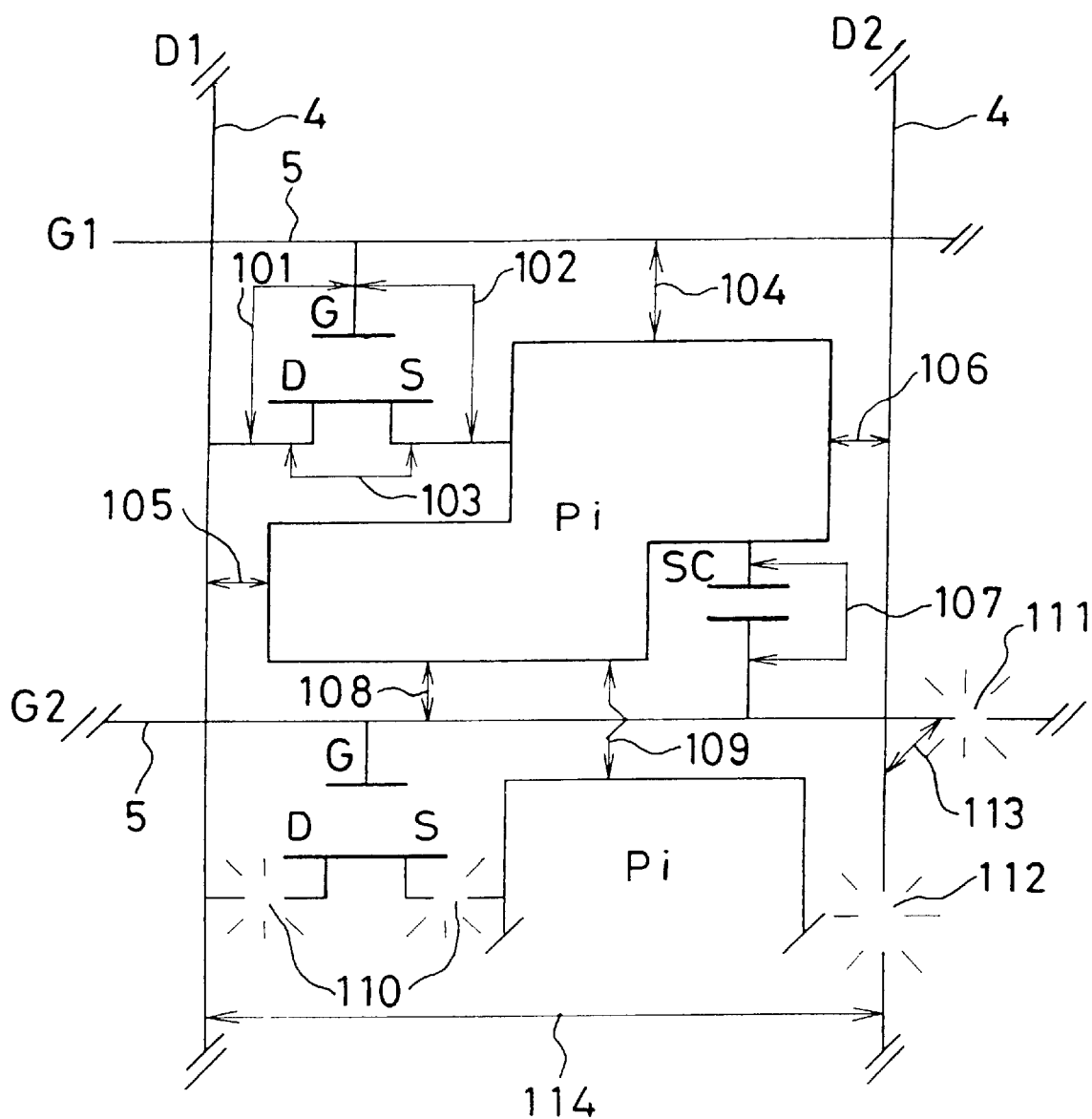
FIG. 3 is a diagram explaining an embodiment of the present invention and explaining the types of defects in a TFT array.
Figure 4:
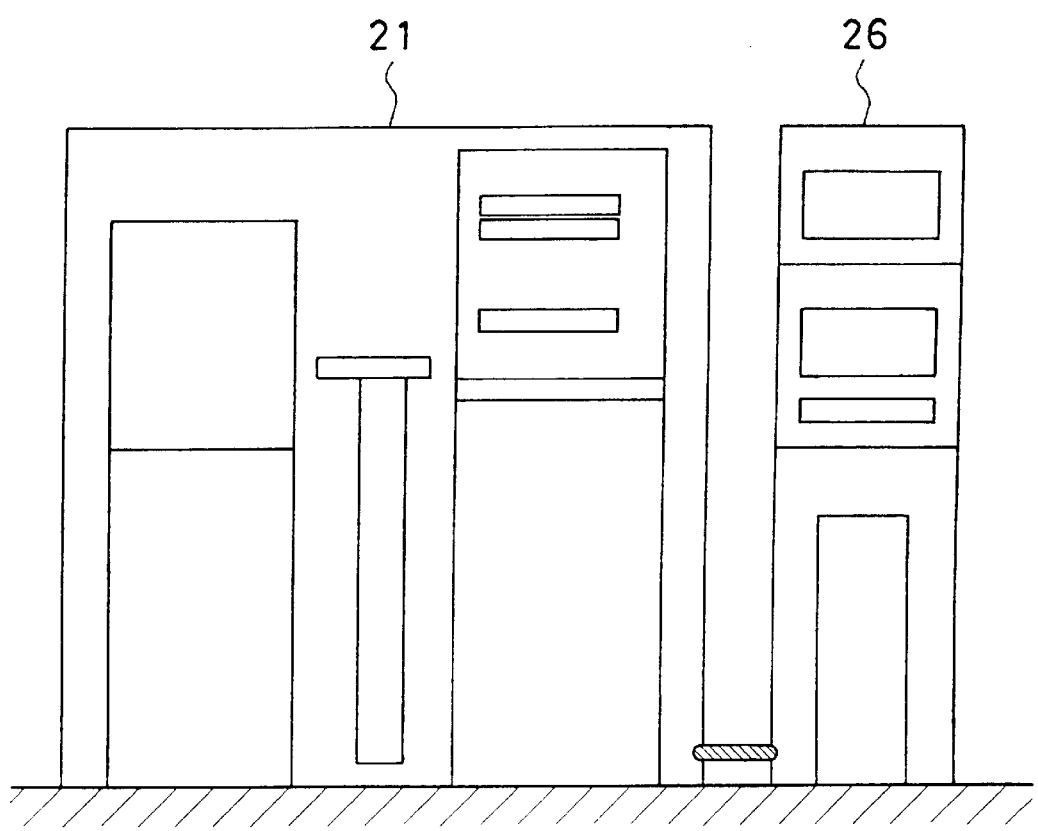
FIG. 4 is a diagram explaining an embodiment of the present invention and showing the arrangement of a prober and a tester.

FIG. 3 is a diagram explaining the defects on the LCD substrate. FIG. 4 is a diagram showing the arrangement and configuration of the tester device and the prober apparatus. Operation of the embodiment of the present invention will be described with reference to FIGS. 1 through 3.

Referring to FIGS. 1 and 4, the prober apparatus 21 (refer to FIG. 4) performs initialization and is brought into a start up state after it confirms that there is no LCD substrate 1 on the suction table 17 and that components are in given respective positions.

In response to a start signal from the prober apparatus 21, a power on signal is transferred to the light control box 16 so that the D.C. light source of the illumination jig 11 is lit. In the sequential operation, the LCD substrate 1 is transferred to on the suction table 17 on the stage 18 by means of the handling device such as robot while the D.C. light source 14 is lit. Alignment of the LCD substrate 1 on the suction table 17 is initiated for correcting the position of the LCD substrate 1 so that it is positioned on the same position of the probe unit 13.

Subsequently, the stage 18 is elevated, so that the manipulator 13a is brought into contact with the gate and drain terminals 2 and 3 of the LCD substrate 1. Under this condition, inspection is carried out in accordance with the inspection process by applying a voltage to respective terminals in response to an inspection initiating signal from the tester device 26 (refer to FIG. 4).

The polarization shutter 12 is opened for a predetermined period of time (3 ms to N ms) at the point defect detection step in the inspection process so that the LCD substrate 1 is irradiated over the entire surface thereof with the D.C. light 20. Point defect detection is conducted for locating the defect position under this condition.

After a sequence of the inspection process is completed, the stage 18 is moved to next panel. After all panels on the LCD substrate 1 have been inspected, the stage 18 is lowered so that it is separated from the manipulator 13a. The LCD substrate 1 is transferred to a given cassette position and next LCD substrate 1 is similarly transferred on to the stage 18.

This operation is repeated a number of times equal to the number of the LCD substrates under inspection.

Now, the above-mentioned sequential operation will be described in more detail.

In response to an initiating trigger signal from the prober apparatus 21, the D.C. light source 14 is lit and the tester device 26 is turned on, so that the inspection is initiated.

Turning on of the D.C. light source 14 causes the light control box 16 to be turned on. It is preferable that the light control box 16 be powered with single phase 100 V and the lamp output adopt constant current regulation scheme and the output precision be in the order of 3% or less. The light control box has a variable effective range from about 20 to 120%. If the input current is high and low, then the illumination becomes high and low, respectively. Although the input current is not remotely controlled, but preset, it may be remotely controlled by an additional external input circuit.

Figure 7:
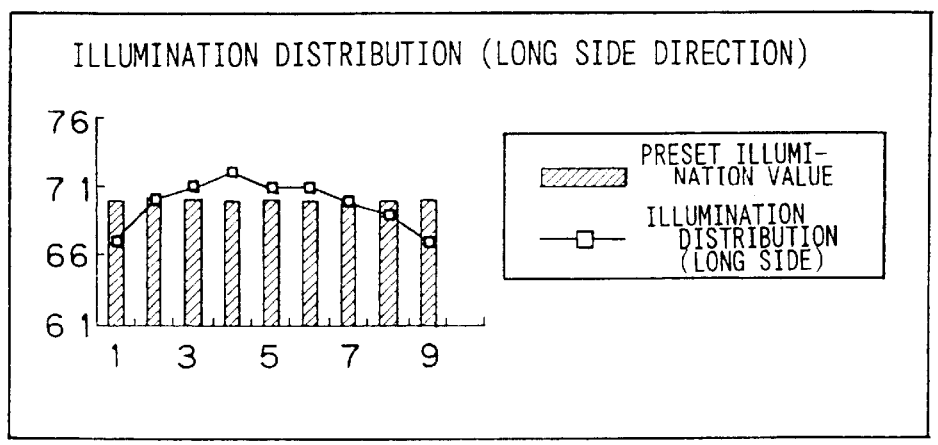
FIG. 7 is a graph explaining an embodiment of the present invention and showing one example of the illumination distribution on the substrate.

D.C. light sources 14 each comprising a plurality of D.C. fluorescent lamps are disposed in the jig 11 in an equally spaced manner. The number of fluorescent lamps is determined in proportion with the area of the LCD substrate 1. The determination is made based upon the measurement of the distribution of illumination on the surface of the LCD substrate 1. It is necessary to dispose the D.C. light sources 14 so that the uniformity of the illumination on the LCD substrate 1 is with 3% as shown in FIG. 7. In this case, the illumination on the four peripheral area on the LCD substrate 1 is liable to decrease. In order to solve this problem, it is necessary to dispose D.C. fluorescent lamps so that the area larger than that of the LCD substrate 1 is illuminated.

Prior to inspection, the necessary illumination should be preliminarily determined in the tester device 26 so that it is matched with the leakage detection sensitivity of the auxiliary capacitors 8 (refer to FIG. 2).

In one embodiment of the present invention, the necessary illumination is preferably, for example, 50 cd to 70 cd. These illumination values are minimum and maximum illumination values at which the actual transistor circuits can be turned on or off.

A very low illumination is required for the inspection while the brightness of the common indoors fluorescent lamp is about 180 cd to 210 cd. If the inspection is made at the illumination of the indoors fluorescent lamp, a-Si film becomes fully conductive. Accordingly, the function of turning on or off of the transistor circuits can not confirmed. In this case, the position of any defect can not be determined since it is difficult to detect the point defect to be detected per se. Accordingly, the electrostatic charge which is accumulated in the auxiliary capacitor 8 from the gate and drain terminals 2 and 3 is completely leaked, so that no inspection of the point defect is possible. Thus, the low illumination and the uniformity of the illumination within 3% is required.

The LCD substrate 1 will now to explained with reference to FIG. 1. The position of the alignment marks in the cross form on the LCD substrate 1 are recognized by means of camera included in the probe unit 13 so that the LCD substrate 1 can be transferred to the suction table of the stage 18 by means of a handling apparatus such as robot and all the gate and drain terminals 2 and 3 of the LCD substrate 1 can be in precise contact with the manipulator 13a of the probe unit 13. Correction of the position of the LCD substrate 1 is conducted so that the probe needles of the manipulator 13a are precisely matched with the gate and drain terminals 2 and 3 on the LCD substrate 1 and the LCD substrate 1 is then sucked to a fixed position on the suction table 17.

Now, contact operation will be described. The stage 18 and suction table 17 are elevated by driving the stage shaft 19 by means of drive means such as motor until the probe needles of the manipulator 13a are brought into contact with the gate and drain terminals 2 and 3 of the LCD substrate 1 and the stage 18 and the suction table 17 are overdriven by a predetermined distance. Test is then started in response to an inspection start signal from the tester device 26.

At this time, the inspection sequence is run by the tester device 26 while the area above the suction table 17 is in the dark environment by the shield box 15.

The inspection sequence comprises the steps of successively applying a given voltage to a number (N) of gate terminals 2 on divided areas of the LCD substrate and detecting the resistance values for determining whether or not there is any break or short on the gate lines.

Thereafter, a voltage is applied to the drain terminal 3 for inspecting the line defect on the drain line.

Subsequently, the voltage which is applied to the gate terminal 2 causes the electrostatic charges to be accumulated on the auxiliary capacitor 8. When the accumulated charges are discharged, the amount of the charge leaked from the auxiliary capacitor 8 is observed for a predetermined hold period of time via a probe needle extending from the drain terminal 3.

Determination is made whether or not there is a defect based on how much the charge is leaked. This inspection is referred to as "point defect detection process".

When the inspection sequence is changed to the point defect detection step, a signal which causes the shutter to be opened is firstly sent to the polarization shutter 12 from the tester device 26, so that the polarization shutter 12 is opened for 20 ms (min) to 60 ms (max). The transistors 6 and pixels 7 which are possibly several million in quantity is irradiated with the D.C. light 20. The write voltage which is applied to the gate terminal 2 is read from the drain terminal 3 by means of the tester device 26 for locating the position of point defect, if any.

The polarization shutter 12 is identical in structure with the commonly used TN (twisted nematic) liquid crystal material which is charged between the TFT substrate and transparent CF substrate.

A voltage is normally applied to the polarization shutter 12. The polarization shutter 12 is opened when the applied voltage drops to the ground level only in the point defect detection process. When the shutter is closed, a voltage is applied thereto. In one embodiment of the present invention, TN type liquid crystal structure is adopted for transmitting light and for opening and closing the shutter for a short period of time. At this time, it is possible to identify the type of defect as shown in FIG. 3, due to the a-Si film residue.

The defects include a short 101 between G (gate) and D (drain) in the TFT transistor circuit, a short 102 between G (gate) and S (source) in the TFT transistor circuit, a short 103 in the D (drain) and S (source) in the transistor circuit, a short 104 between G1 (gate) and Pi (pixel electrode), a short 105 between P1 and Pi, a short 106 between D2 and Pi, a SC short 107, a short 108 between G2 and Pi, a short 109 between Pi and Pi and defective transistor characteristics defect 110 as shown in FIG. 3. These defects are commonly referred to as "point defect".

It is possible to detect defects such as a break 111 of the G line, a break 112 of D line, a short 113 between D and G lines, and a short 114 between D and P lines which are detected by prior art inspection. These defects are commonly referred to as "line defect".

Figure 5:
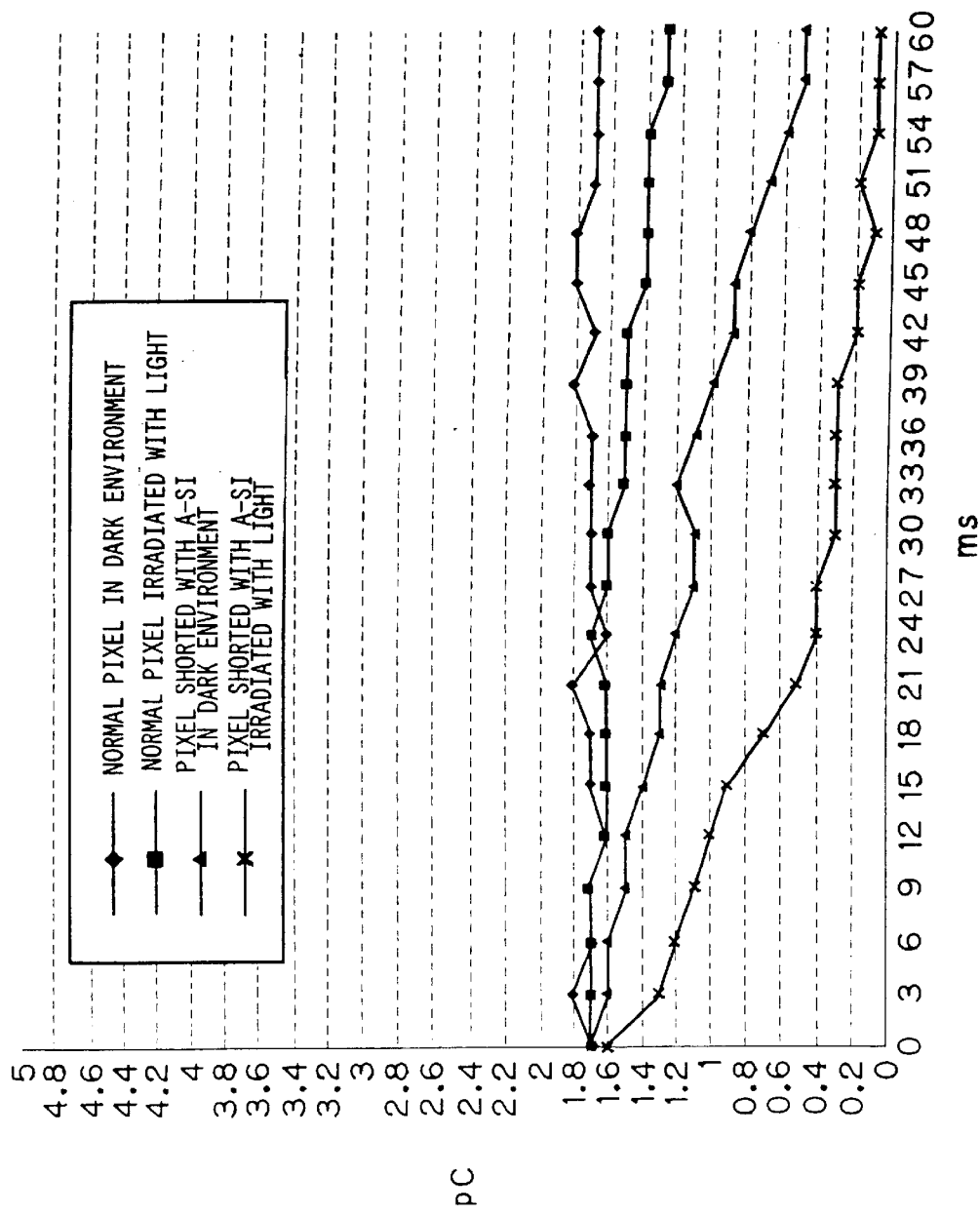
FIG. 5 is a graph explaining an embodiment of the present invention and showing the amount of leaked electrostatic charge which is accumulated in an auxiliary capacitor which is changed with time.
Figure 6:
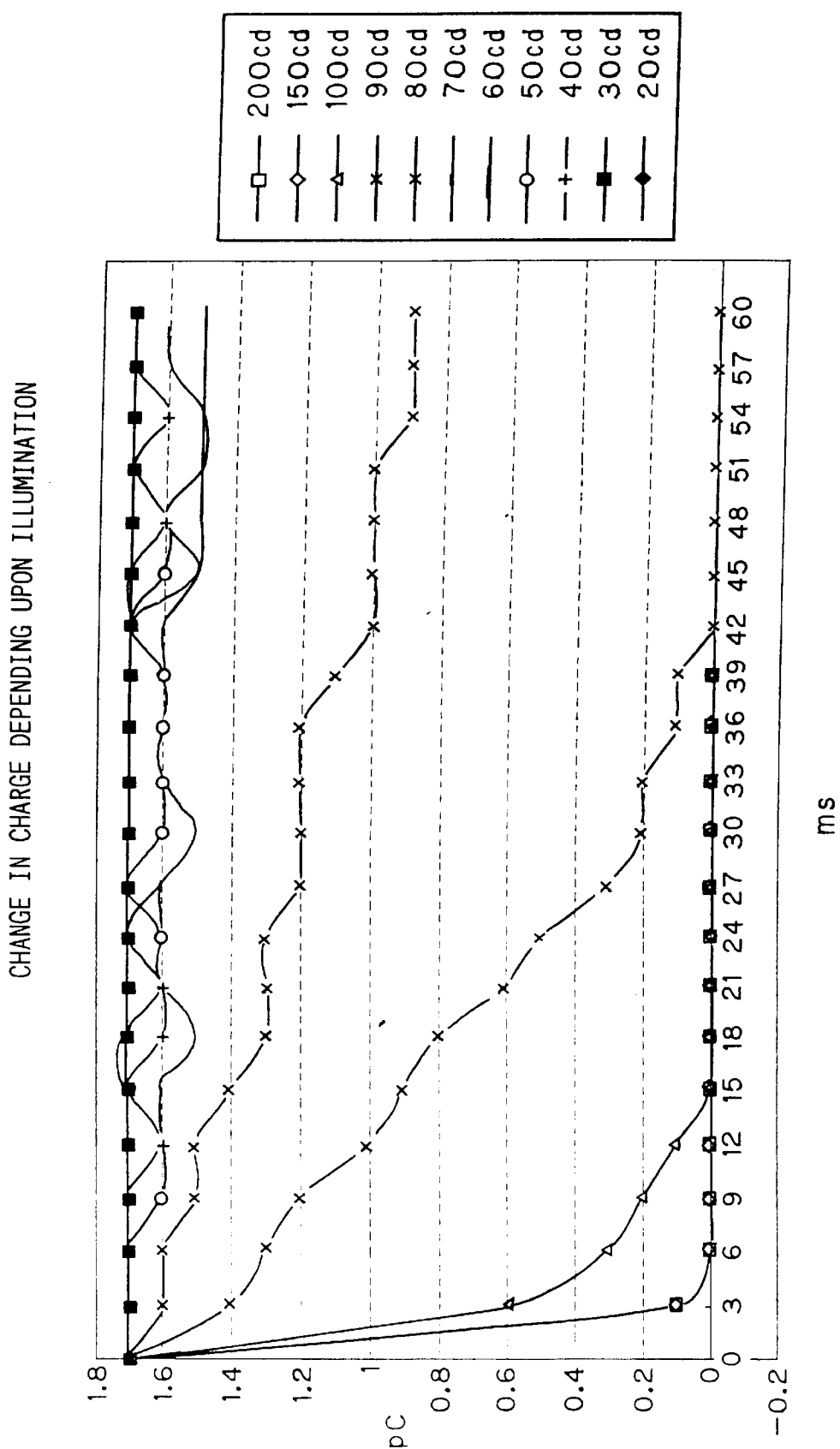
FIG. 6 is a graph explaining an embodiment of the present invention and showing the change in the electrostatic charge with time depending upon illumination.

Comparison between a normal pixel and a pixel having a short of a-Si film is made by measuring the charge on the auxiliary capacitor 8. FIG. 5 shows the changes in leaked charge with time since the time when written data is read from a data write drain terminal 3 by applying a voltage to the gate terminal 3 to render the TFT conductive to the lapse of 60 ms.

FIG. 5 is a graph showing the amount of leaked charge which has been accumulated in the auxiliary capacitor with lapse of time in a case in which the normal pixel is measured in a dark environment by a prior art method, a case in which the normal pixel is irradiated with D.C. light, and a case in which a pixel which is shortened with the a-Si film is irradiated with D.C. light.

As is apparent from FIG. 5, a result of the measurement of a normal pixel in a dark environment in a conventional manner (represented by black dots in FIG. 5) shows that the charge is not clearly leaked although the charge exhibits a change of 0.1 pC to 0.2 pC 60 ms after the completion of charge write.

In a case in which the normal pixel is irradiated with D.C. light (as represented by square black designations in FIG. 5), a small leak in the order of about maximum 0.5 pC due to photoconductive effect of the a-Si film is detected after the lapse of 60 ms since completion of charge write. However, this amount of leaked charge does not directly indicate point defect. The amount of leaked charge of the auxiliary capacitor 8 tends to be as low as 0.1 pC when the normal pixel is measured in a dark environment in a conventional manner whereas the amount of leaked charge of the auxiliary capacitor 8 tends to be as high as 0.5 pC when the normal pixel is irradiated with D.C. light 20.

A case in which the a-Si film is shorted with pixel due to a fact that the film is not etched for some reason when the pixel is irradiated with D.C. light (represented by x designations in FIG. 5) will be described. In this case, maximum 1.0 pC of leaked charge can be detected 60 ms after the completion of charge write.

It can be seen that the amount of the leaked charge from the auxiliary capacitor 8 of the pixel which is shorted with the a-Si film decays as large as 1.1 pC and abruptly decays after the lapse of 6 to 12 ms. It is also seen that 0.4 pC of charge is leaked 6 ms after the completion of charge write and 0.7 pC charge is leaked 30 ms thereafter. Under this condition, the transistors are incapable of turning on or off.

Conversely, when the pixel which is shorted with the a-Si film is inspected in a dark environment (as represented by black triangular designations in FIG. 5), the amount of the leaked charge from the auxiliary capacitor 8 can not accurately measured, so that location of the defect or detection of point defect can not sometimes be achieved.

In one embodiment of the present invention, the panel of the LCD substrate 1 is irradiated with light. A.C. fluorescent lamp which is used for indoor lighting flickers due to A.C. frequency. This provides ununiformity of illumination, resulting in difficulty in inspection. Accordingly, light which will not flicker from light source such as D.C. light source is preferable.

The target panel of the LCD substrate 1 under inspection comprises a multiplicity of areas, any of which can be measured. Accordingly, the inspection apparatus has an layout enabling measurement of one area to N areas of the panel to be made. The operation comprising the steps of moving the stage 18 and suction table 17 in an X and Y directions and elevating and lowering the stage shaft 19 and the stage 18 to contact the probe needles of the probe unit 13 and the manipulator 13a with a gate and drain terminals 2 and 3 of the LCD substrate 1 is repeated a number of times equal to the number of areas of the target panel of the LCD substrate 1 under inspection.

In accordance with the embodiment of the present invention, the illumination of light can be preset to a desired value and the precision of the illumination distribution is enhanced. Specifically, the presettable illumination can be varied in the range of 20% to 120% of the output current value from the light control box.

When fluorescent lamps are used, the illumination at the periphery of a mother glass substrate tends to be inferior to the central area thereof. Layout of the lamps over a wide area to cover the entire stage enables the variations in the illumination distribution within 3% and the uniform illumination to be achieved at a low cost.

Another embodiment of the present invention will be described. In this embodiment, the thin film transistors (TFT) are irradiated with light to bring the TFT into a conductive state for detecting a break, short or pattern and defective characteristics of the TFT. The type of defects which can be detected are different from those of the foregoing embodiment.

The embodiment may be configured so that point defect detection is conducted by irradiating each pixel with an electron beam from an electron gun and with respective lights on both the upper and lower sides thereof or simultaneously irradiating it with light on the upper and lower sides thereof and a defect is detected by temperature control. Alternatively or additionally, an optical switching element is irradiated with light as is similar to the above-mentioned conventional inspection method. Detection of defect can be carried out by using laser light, or by irradiating the thin film transistor with visible light for measuring the insulation resistance between terminals;

Although the essential configuration of another embodiment for conducting the above-mentioned detection is identical with that in the above-mentioned embodiment, irradiation of thin film transistor with light will be described in more detail. The configuration of the surface light source prober apparatus is identical with that of the foregoing embodiment.

The direction of irradiation of the thin film transistor with radiation such as light (including visible light) laser light and electron beam may include upper direction, lower direction and simultaneous combination thereof.

Defect inspection is carried out by bringing the thin film transistor into a conductive state. Detection of a break, short of a pattern, defective TFT characteristics and point defect of insulation resistance between terminals and pixel is conducted. However, there is a problem that its mechanism becomes complicated and the cost becomes higher.

Some defects can not be detected if the TFT is exposed to light.

Inspection of defective TFT characteristics is conducted in a dark environment. If the a-Si film is brought into a completely conductive state, then the function of the TFT would be lost. Accordingly, since a current will flow across the gate, source and drain of the TFT momentarily, electrostatic charge which will otherwise be accumulated will be never accumulated.

Even if the inspection is conducted under this condition, it is very difficult to conduct a defect inspection referred to as "point defect inspection".

In a further embodiment of the present invention, the thin film transistors are irradiated with light. Irradiation of the thin film transistors with light from D.C. lamp can reduce the ununiformity of light due to A.C. components and improve the precision of the uniformity of the illumination distribution over the substrate which is actually inspected.

Since the light irradiation inspection using D.C. lamps is conducted at a low illumination and uniform illumination distribution in this embodiment, it is conducted by detecting the small amount of leaked charge while the thin film transistors are not in a completely conductive state. Various defects in the TFT pixel areas as shown in FIG. 3 can be detected.

Effects of the present invention are summarized as follows. As mentioned above, the present invention provides foregoing effects.

A first advantage of the present invention resides in that since the photoconductive effect of a-Si film is used the position of a point defect can be located and the type of the defect can be identified as point defect by determination of the amount of the charge which is leaked from an auxiliary capacitor accumulating the charge, the leakage being caused by a connection of the a-Si film residue with other circuit in a position where no-Si film should not to be formed.

A second advantage of the present invention resides in that flickering of light in a panel under inspection and lowering of the inspection precision due to illumination ununiformity can be reduced by adopting D.C. type fluorescent lamps which do not depend upon the frequency, other than commonly used A.C. type fluorescent lamps for irradiating the a-Si film with light for inspection thereof.

A third advantage of the present invention resides in that the illumination can be preset to a desired level and the precision of the illumination distribution can be enhanced. If fluorescent lamps are used, illumination at the periphery of a mother glass substrate is liable to be inferior to that at the central area thereof. However, in accordance with the present invention, layout of fluorescent lamps in a wide area to cover the entire stage allow the variation in illumination to be suppressed within, for example, 3% and uniform illumination to be achieved at a relatively low cost.

It should be noted that other objects of the present invention will become apparent in the entire disclosure and that modifications may be done without departing the gist and scope of the present invention as disclosed herein and appended herewith.

Also it should be noted that any combination of the disclosed and/or claimed elements, matters and/or items may fall under the modifications aforementioned.

What is claimed is:

1. A surface prober apparatus for inspecting an LCD substrate, said apparatus comprising:

a probe that applies a voltage upon a terminal of said LCD substrate to accumulate electrostatic charge on an auxiliary capacitor of a pixel of said LCD substrate and for reading the accumulated charge; and a controller that controls light from a D.C. light source so that the entire surface of an LCD substrate to be inspected is simultaneously irradiated with said light.

2. A surface light source prober apparatus for inspecting an LCD substrate, comprising:

a probe that applies a voltage upon a terminal of said LCD substrate to accumulate electrostatic charge on an auxiliary capacitor of a pixel of said LCD substrate and for reading the accumulated charge; and a shutter that controls light from a D.C. light source that simultaneously irradiates the entire surface of an LCD substrate when said shutter is open.

3. The surface light source prober apparatus as claimed in claim 2, wherein said shutter is a polarization shutter having a TN type liquid crystal structure.

4. A surface light source prober apparatus for point defect inspection, said apparatus comprises:

a D.C. light source that irradiates the entire surface of an LCD substrate;

a stage that holds said LCD substrate;

a probe that applies a voltage upon a terminal of said LCD substrate to accumulate electrostatic charge on an auxiliary capacitor of a pixel of said LCD substrate and for reading the accumulated charge; and a shutter disposed between said D.C. light source and said LCD substrate, wherein the light from said D.C. light source is simultaneously incident upon the entire surface of the LCD substrate when the shutter is open.

5. A surface light source prober apparatus for point defect inspection, said apparatus comprises:

a D.C. light source that irradiates the entire surface of an LCD substrate;

a stage that holds said LCD substrate;

a polarization shutter that controls the light from said D.C. light source that is incident upon said LCD substrate; and a probe that applies a voltage upon a terminal of said LCD substrate to accumulate electrostatic charge on an auxiliary capacitor of a pixel of said LCD substrate and for reading the accumulated charge, wherein the entire surface of the LCD substrate to be inspected is simultaneously irradiated with the light from said D.C. light source when said polarization shutter is open.

6. The surface light source prober apparatus as claimed in claim 5, wherein the position of and the type of defect are identified based upon a result of measurement of the amount of the leaked accumulated charge which is obtained by bringing a thin film transistor provided each of pixels of said LCD substrate into a conductive state.

7. The surface light source prober apparatus as claimed in claim 5, wherein said D.C. light source is configured so that the variation in the illumination over said LCD substrate is within a predetermined range.

8. The prober apparatus as claimed in claim 7, wherein said D.C. light source is configured so that the variation in the illumination over said LCD substrate is less than or equal to 3%.

9. The surface light source prober apparatus as claimed in claim 7, wherein illumination of said D.C. light source is not less than 50 cd.

10. The surface light source prober apparatus as claimed in claim 7, wherein illumination of said D.C. light source is not greater than 70 cd.

11. The surface light source prober apparatus as claimed in claim 5, wherein a point defect detection of a thin film transistor is conducted by detecting a short of a pixel caused by the presence of an amorphous silicon film residue left in a thin film transistor manufacturing process through measuring the amount of electrostatic charge leaked from an auxiliary capacitor provided in said pixel.

12. The surface light source prober apparatus as claimed in claim 5, wherein said D.C. light source comprises a D.C. lamp.

13. The surface light source prober apparatus as claimed in claim 5, wherein said polarization shutter has a TN type liquid crystal structure.

14. The method of inspecting an LCD substrate as claimed in claim 9, wherein said polarization shutter is used to control the transmission of said D.C. light toward said LCD substrate.

15. The method of inspecting an LCD substrate as claimed in claim 14, wherein the illumination issuing from said D.C. light source is controlled so that the variation of illumination over the surface of said LCD substrate is less than or equal to 3%.

16. The method of inspecting an LCD substrate as claimed in claim 14, wherein the illumination value of said D.C. light source is matched to the leakage detection sensitivity of said auxiliary capacitor.

17. The method of inspecting an LCD substrate as claimed in claim 14, wherein said LCD substrate is exposed to light from said D.C. light source for at least 20 milliseconds.

18. The method of inspecting an LCD substrate as claimed in claim 14, wherein said LCD substrate is exposed to light from said D.C. light source for no longer than 60 milliseconds.

19. The surface light source prober apparatus as claimed in claim 13, wherein an applied voltage controls of the opening and closing of said polarization shutter.

20. A method of inspecting an LCD substrate for point defects using a prober apparatus comprising a D.C. light source, a polarization shutter and a probe that applies voltage and reads accumulated charge, said method comprising:

applying a voltage from said probe upon a terminal of said LCD substrate to accumulate electrostatic charge on an auxiliary capacitor of a pixel on said LCD substrate;

adjusting the illumination from said D.C. light source so the illumination simultaneously irradiates the entire surface of said LCD substrate; and determining if said pixel is defecting with said probe an amount of the accumulate charge which has been leaked from the auxiliary capacitor provided in the pixel.

* * * * *